United States Patent [19]

Schoen et al.

[11] 3,936,430

[45] Feb. 3, 1976

[54] PROCESS FOR THE PREPARATION OF HALOGEN-CARRYING RUBBERLIKE COPOLYMERS

[75] Inventors: Löwhardt A. A. Schoen; Marinus J. R. Visseren, both of Geleen; Jean G. van der Sangen, Spaubeek, all of Netherlands

[73] Assignee: Stamicarbon N.V., Geleen, Netherlands

[22] Filed: Dec. 22, 1972

[21] Appl. No.: 317,786

[30] Foreign Application Priority Data

Dec. 23, 1971 Netherlands.................... 7117709

[52] U.S. Cl..... 260/80.78; 260/88.2 S; 260/94.9 H; 260/96 HA
[51] Int. Cl.²..................... C08F 210/00; C08F 110/02; C08F 212/00
[58] Field of Search..................... 260/80.78, 96 HA

[56] References Cited
UNITED STATES PATENTS

| | | | |
|---|---|---|---|
| 2,631,984 | 3/1953 | Crawford et al. | 260/5 |
| 2,944,578 | 7/1960 | Baldwin et al. | 152/330 |
| 3,524,826 | 8/1970 | Kresge et al. | 260/5 |
| 3,632,671 | 1/1972 | Furukawa et al. | 268/876 |
| 3,657,046 | 4/1972 | Furukawa et al. | 156/315 |

FOREIGN PATENTS OR APPLICATIONS 1,023,407    3/1966    United Kingdom

OTHER PUBLICATIONS

Campbell and Lyman, J. Polymer Science, 1961, 55, 169–180.
Chemical Abstracts, 1965, Vol. 63, 5875c.
Chemical Abstracts, 1973, Vol. 79, 93215t.

Primary Examiner—Joseph L. Schofer
Assistant Examiner—A. L. Clingman
Attorney, Agent, or Firm—Cushman, Darby & Cushman

[57] ABSTRACT

Process for preparing halogenated rubbery copolymers of ethylene, at least one other $\alpha$-alkene, dicyclopentadiene and optionally one or more other polyenes is disclosed, wherein the copolymer is halogenated in the substantially undissolved or solid state with molecular halogen at a temperature of between −30° and +80°C. The halogenated copolymers produced by the process of the present invention may be covulcanized with strongly unsaturated rubbers to yield products which have excellent physical and mechanical properties, with reduced vulcanization times. The vulcanizates are suited for numerous applications including, for instance, car tires.

14 Claims, No Drawings

PROCESS FOR THE PREPARATION OF HALOGEN-CARRYING RUBBERLIKE COPOLYMERS

BACKGROUND OF THE INVENTION

The present invention relates to a process for preparing halogenated rubbery copolymers of ethylene, at least one other α-alkene, dicyclopentadiene and optionally one or more other polyenes.

Rubbery copolymers of ethylene, at least one other α-alkene and at least one polyene have been known to the art for a considerable period of time. These copolymers, generally called EPDM polymers or, more shortly, EPDM, are normally composed of ethylene, propylene, and/or butylene-1, and one or more polyenes, such as hexadiene-1,4, 5-ethylidene norbornene-2 and dicyclopentadiene. The EPDM polymers, unlike any other elastomers, have excellent resistance to oxidation and the action of ozone.

Admixing EPDM, particularly EPDM wherein the polyene is dicyclopentadiene, with diene rubbers, such as polyisoprenes, polybutadiene, and styrene-butadiene copolymers, results in a considerable improvement of the generally low ozone resistance of the diene rubbers. Unfortunately, however, the ozone resistance improvement is generally achieved at the cost of a decrease of the physical and mechanical properties of the resulting vulcanization. This decrease of physical and mechanical properties of the vulcanizates is believed due to the low compatibility of EPDM and the diene rubber, which low compatibility is possibly due to the low degree of unsaturation of the EPDM polymers (whose polyene content is normally no greater than 1–5% by weight) and to the slow curing rate of EPDM. It is known that halogenated rubbery copolymers of ethylene, at least one other α-alkene, and at least one polyene possess a higher curing rate, and that the presence of the halogen in the copolymer results in a distinct improvement in the compatibility of the EPDM and the diene rubber during covulcanization.

The prior art has proposed several processes for the preparation of halogenated rubbery copolymers of ethylene, at least one other α-alkene and at least one polyene, but all of these processes proposed by the prior art have one or more drawbacks. For instance, it has been proposed that halogenated EPDM polymers be prepared with the aid of organic halogenating agents which are mixed with the solid polymer, such as, for instance, by milling, after which the admixture is heated to a temperature above 100°C for a considerable period of time. Another proposal is to react such organic halogenating agents at a temperature above 100°C with EPDM dissolved in an organic solvent. If the reaction mixture is exposed to UV irradiation, the temperature may be reduced to the range of 65°–80°C. These processes have the drawbacks that organic halogenating agents are expensive and that the decomposition products of the organic halogenating agents are difficult to isolate from the polymer. Furthermore, the halogenation occurs only at relatively high temperatures, which results in considerable gel formation.

It has also been proposed to use molecular halogen in the preparation of halogenated EPDM, with the halogen contacting the EPDM dissolved in an organic solvent at a temperature above 100°C. Again, if the reaction is conducted with exposure to UV light, the temperature may be reduced to the range of 65°–80°C.

It has also been proposed that brominated EPDM be prepared by reacting molecular bromine at a temperature of −30° – 80°C with EPDM dissolved in an inert organic solvent. It has also been proposed that EPDM be chlorinated with molecular chlorine at a temperature below 80°C. In this latter instance, the EPDM polymers contain termonomers of a special type, which type does not include dicyclopentadiene.

It should be noted that in the above described processes for the preparation of halogenated EPDM polymers, the processes wherein the EPDM is halogenated in the form of a solution in an organic solvent has the additional drawback that the halogenation is normally conducted under such conditions that a portion of the organic solvent also is halogenated. This solvent halogenation can be avoided by performing the halogenation in halogenated organic solvents, such as carbon tetrachloride, but this approach also has disadvantages. The EPDM is normally prepared in organic solvents which are not halogenated, which results in a situation wherein it is necessary to first isolate the EPDM from the solvent used in the polymerization, and then to incorporate the EPDM in the halogenated organic solvent. It will be clear that this is a costly approach, especially since the EPDM has a slow rate of dissolution in all organic solvents.

SUMMARY OF THE INVENTION

Halogenated rubbery copolymers of the EPDM type are prepared by halogenating EPDM in the solid state with molecular halogen at a temperature of between −30°C and +80°C. The halogenated EPDM may be in the form of a moist or dry crumb, or may be in the form of a dispersion in a non-solvent, such as water.

The resulting halogenated EPDM can be covulcanized with highly unsaturated rubbers, such as SBR, to obtain vulcanizates in short vulcanization times which have excellent physical and mechanical properties.

DETAILED DESCRIPTION OF THE INVENTION

The present invention provides a process for preparing halogenated rubbery copolymers of ethylene, at least one other α-alkene of up to 8 carbon atoms, dicyclopentadiene, and optionally one or more other polyenes of 4 to 12 carbon atoms. The process of this invention either completely or substantially obviates the drawbacks mentioned above as regards the prior art halogenation processes. The present process is characterized in that the unhalogenated rubbery copolymer containing dicyclopentadiene is halogenated at a temperature between −30° and +80°C in the solid state with molecular halogen.

The improved process of the present invention is all the more surprising because copolymers containing dicyclopentadiene cannot be halogenated in the form of solutions of the copolymers in solvents at a temperature of −30° to +80°C with molecular halogen to produce fast-curing halogenated copolymers, not withstanding the fact that the halogenation is conducted in the homogeneous phase. The physical and mechanical properties of the polymers obtained from such solution halogenation are considerably inferior to those of the halogenated, initial copolymers. It was completely unexpected that an otherwise identical process but wherein the dicyclopentadiene-containing copolymers are halogenated in the solid phase, that is, the non-homogeneous phase, would produce fast curing halogenated copolymers which can be readily cured together with highly unsaturated rubbers to yield vulcanizates possessing very good physical and mechanical properties.

The rubbery copolymers which are halogenated generally contain from about 20 to about 74.7 weight percent of ethylene, from about 25 to about 79.9 weight percent of at least one other α-alkene of up to 8 carbon atoms, preferably propylene and/or butylene-1, and at least 0.3, and up to about 20 weight percent, of dicyclopentadiene. The copolymer may contain other polyenes of from 4 to 12 carbon atoms, such as, for instance, hexadiene-1,4 5-vinylnorbornene-2, 5-(1'-propenyl)norbornene-2 or 5-ethylidenenorbornene-2. These unhalogenated copolymers are produced using conventional processes known to the art. For instance, the process of copending, commonly assigned application Ser. No. 293,668 filed Sept. 28, 1972 (Rule 60 continuation of Ser. No. 5,096, filed Jan. 22, 1970, now abandoned), the disclosure of which is hereby incorporated by reference, may be used. Other polyenes which may be optionally present in the copolymers are disclosed in this copending application.

The halogenating agent which is used in the process of the present invention is one or more molecular halogens, such as molecular chlorine or bromine or mixtures thereof. Molecular chlorine is preferred, because the feed rate thereof can be easily controlled, even at lower halogenation temperatures, such as room temperature. The molecular halogen is normally employed in a large excess, based on the degree of unsaturation of the copolymer. Normally, the copolymer will have an iodine value of about 0,1 to about 30, and the molecular halogen is normally used in amounts of from 0.5 to 20, preferably from 1 – 6 moles, per gram equivalent of unsaturation in the copolymer. Smaller amounts of halogen may be used, but in such case, the resulting vulcanizates do now show the surprising improvement of the preferred vulcanates. Furthermore, even larger amounts of molecular halogen may be used, but no advantages are obtained thereby and the process costs will generally be substantially increased.

As mentioned, the halogenation temperature is generally in the range of from −30° to +80°C, but it is to be understood that the upper portion of this temperature range is not necessary to the successful practice of the process of the present invention. In fact, it is preferred that the halogenation temperature be between −30° and +50°C. The halogenation is conveniently conducted at atmospheric pressure, but higher or lower pressures may be used as desired.

The halogenation of the dicyclopentadiene-containing copolymers can be conducted in any conventional manner, provided that the copolymers are in the solid state. For instance, the EPDM may be halogenated in the form of plates, sheets, strands or crumbs. It is also possible to halogenate the EPDM in the form of a coarse dispersion or suspension in a non-solvent such as, for instance, water. The particle size of the copolymer is not critical. When the EPDM is used in the form of particles, the average particle size is usually within the range of 0.01 to 20 mm. Preferably, the EPDM is used in the form of a moist or dry crumb, or in the form of an aqueous dispersion, because the EPDM production process involves stages wherein the EPDM is present in such forms. For instance, in one preferred embodiment, the EPDM is in the form of a rubber crumb having a particle size between 3 mm and 2 cm and a water content of between 0.01 and 100% by weight, based on the weight of the EPDM.

The process of the present invention is preferably conducted in the absence of light, but it will be clear that the halogenation may be conducted in diffuse daylight. In any event, there is no need to use illumination during the halogenation.

Depending upon the type of halogen and the amount of unsaturation in the copolymers, the halogenated copolymers produced by the process of the present invention generally contain from 0.1 to 17, preferably 0.5 to 5, percent by weight of halogen, based on the total weight of copolymer.

In contrary to halogenated dicyclopentadiene containing copolymers, produced in other ways, the halogenated copolymers prepared according to the invention contain at least 0.35% by weight of allylic bounded halogen, taken up in the dicyclopentadiene units of the copolymer.

The halogenated copolymers produced by the process of the present invention may be admixed with customary additives, such as zinc oxide, magnesium oxide, stearic acid, sulphur, antioxidants, curing accelerators, tackifiers, dyes, carbon black and pigments. In addition, of course, fillers, which may be reinforcing fillers or non-reinforcing fillers such as whiting, kaolin and carbon black, as well as extender oils, may also be added to the copolymer. If desired, some of these additives may be present during the preparation of the unhalogenated copolymer and/or during the halogenation of the copolymer.

The halogenated copolymers produced according to the present invention may be produced in the form of crumb, sheets, strands or bales. An important advantage of the halogenated copolymers of the present invention is that they can be easily and rapidly cured, for instance, using a cure time of only a few minutes.

The halogenated copolymers produced according to the present invention can be cured using conventional methods, such as for instance, by means of zinc oxide and/or magnesium oxide. If desired, the curing or vulcanization may be in the presence of sulphur and/or curing accelerators such as guanidine derivatives, mercaptobenzthiazoles, thiurams and thiuram disulphides. Free-radical sources, such as peroxides, may be employed if desired, but this is unnecessary. Generally, the curing of the halogenated copolymers produced according to the present invention will involve a curing recipe based upon sulphur and zinc oxide and/or magnesium oxide.

The halogenated copolymers produced according to the present invention may be mixed with highly unsaturated rubbers especially those having iodine numbers of from about 100 to about 250 and molecular weights of at least 20,000, such as natural rubber, styrene-/butadiene rubber, polybutadiene, polyisoprene and copolymers of acrylonitrile and butadiene. The resulting mixtures can be vulcanized in short periods of time to yield products having excellent physical and mechanical properties. The vulcanizates are highly suitable for use in a wide variety of applications such as, for instance, in the production of automobile tires.

The halogenated copolymers produced by the process of the present invention may be employed for a number of other purposes in addition to those uses described above. For instance, the halogenated copolymers may be used to impart impact resistance to thermoplastic polymers such as polyethylene, polypropylene, polystyrene and polyvinylchloride, as a starting material for the preparation of latices, as an admixture with bitumen and as a starting material in a graft polymerization process.

properties of vulcanizates prepared from the initial, unchlorinated polymer, and for the chlorinated terpolymer, respectively.

Table 1

| | curing time | | | | | | | |
|---|---|---|---|---|---|---|---|---|
| | 5 min. | | 10 min. | | 15 min. | | 20 min. | |
| | before | after | before | after | before | after | before | after |
| modulus | 38 | 16 | 72 | 22 | 95 | 25 | 101 | 26 |
| tensile strength | 207 | 40 | 273 | 66 | 287 | 76 | 271 | 100 |
| elongation at rupture | 840 | 680 | 650 | 680 | 620 | 680 | 540 | 740 |
| hardness Shore A | 57 | 50 | 60 | 52 | 62 | 53 | 64 | 55 |

EXAMPLES OF THE INVENTION

The invention will be understood more readily by reference to the following examples; however, these examples are intended to illustrate the invention and are not to be construed to limit the scope of the invention.

In the following examples, the tensile strengths, moduli, and elongation at rupture were measured as specified at NEN 5602 (type 3). The modulus refers to the modulus at 300% elongation, with the tensile strength and the modulus expressed in units of kg/cm$^2$, and the elongation at rupture in percent. The hardness was measured according to NEN 5601 and is expressed in Shore A units. The permanent set, expressed in percent, was measured according to NEN 5606.

Comparative Example A (halogenation in organic solvent)

4 liters of chlorine gas (20°C, 1 atmosphere) were passed during a period of one hour at 25°C in diffuse daylight through a solution of 50 g of a terpolymer in one liter of heptane. The terpolymer was composed of units of 52.3 weight percent ethylene, 43% by weight propylene, and 4.7% by weight of dicyclopentadiene. After the hour of chlorination, pure nitrogen was passed through the solution to remove any excess chlorine. The rubber solution was next treated with hot water and then dried, yielding about 50 g of a terpolymer having a chlorine content of 3.8% by weight. According to the N.M.R. analysis, the halogenated copolymer thus prepared contained only 0.11% by weight of allylic chlorine, taken up in the dicyclopentadiene units of the copolymer.

The chlorinated terpolymer, and the unhalogenated initial polymer, were combined into a given formula and vulcanized, with the physical properties of the resulting vulcanizates measured. 100 parts by weight of the initial polymer or of the chlorinated terpolymer, respectively, were mixed with.

5 parts by weight of zinc oxide,
1 part by weight of stearic acid,
50 parts by weight of high abrasion furnace black,
0.5 parts by weight of 2 mercaptobenzthiazole,
1 part by weight of tetramethylthiuram disulphide,
1.5 parts by weight of sulphur, and
25 parts by weight of naphthenic oil.

The resulting formulations were cured at 160°C and 5, 10, 15 and 20 minutes cure time, and physical properties of the resulting vulcanizates determined for modulus, tensile strength, elongation at rupture and hardness, with the results set forth in Table 1 below. The columns headed 'before' and 'after' refer to the halogenation step, with the results reported for the physical From the results of this comparative example reported in Table 1 above, it will be noted that the halogenation in solution of a terpolymer containing dicyclopentadiene results in the production of a halogenated terpolymer having a curing rate considerably slower than the initial unhalogenated terpolymer. In addition, the mechanical properties of the vulcanizate prepared from the halogenated terpolymer are well below the vulcanizate prepared from the initial unhalogenated terpolymer.

Comparative Example B (chlorination of a polymer containing no dicyclopentadiene)

4 liters of chlorine gas (20°C, 1 atmosphere) were passed during a period of 30 minutes at 25°C in diffuse daylight through a dispersion of 35 g of a terpolymer in 1 liter of water. The terpolymer was composed of 53.9% by weight of ethylene, 42% by weight of propylene, and 4.1% by weight of 5-ethylidenenorbornene-2. The dispersed terpolymer particles ranged in size from 3–22 mm. The dispersion was intensively stirred during the passage of the chlorine gas. After the passage of the chlorine gas was complete, the dispersion was ventilated and pure nitrogen gas was passed through the dispersion to remove any excess chlorine. The chlorinated terpolymer was recovered by filtration, and the resulting rubbery crumb was washed with distilled water and dried. The resulting terpolymer contained 3.3% by weight of chlorine. According to the N.M.R. analysis the copolymer thus prepared contained no allylic bounded chlorine.

The chlorinated terpolymer and the initial unchlorinated terpolymer, were cured at 160°C for 2.5, 5, 10, 15 and 20 minutes curing time, using the formulation of comparative example A, with the properties of the resulting vulcanizates set forth in Table 2 below.

Table 2

| | curing time in minutes | | | | | |
|---|---|---|---|---|---|---|
| | 2.5 after | 5 after | 10 after | 15 after | 20 before | 20 after |
| modulus | 24 | 33 | 65 | 47 | 143 | 47 |
| tensile strength | 82 | 118 | 200 | 171 | 204 | 175 |
| elongation at rupture | 680 | 620 | 560 | 580 | 390 | 640 |
| hardness Shore A | 56 | 60 | 63 | 63 | 74 | 63 |
| permanent set | 26 | 20 | 12 | 14 | 5 | 14 |

It will be noted from the results set forth above that the chlorination of an aqueous dispersion of a terpolymer containing 5-ethylidenenorbornene-2 units instead of dicyclopentadiene units does not result in a fast curing halogenated terpolymer. On the contrary, the terpolymer curing rate is decreased by the introduction of halogen into the terpolymer. Furthermore, the mechanical properties of the halogenated terpolymers are lower than those of the initial, unhalogenated terpolymer.

EXAMPLE 1

80 g of a dry crumb of a terpolymer of 53.8 weight percent ethylene, 41 weight percent propylene, and 5.2 weight percent of dicyclopentadiene, having a particle size of 3 – 22 mm, were chlorinated for 30 minutes with chlorine gas at 70°C at atmospheric pressure. After the chlorination period of 30 minutes, the chlorination reaction was stopped by replacing the chlorine atmosphere with pure nitrogen. Pure nitrogen was then passed through the terpolymer for 1 hour to expel any remaining traces of chlorine. The resulting chlorinated terpolymer contained 4.8 weight percent of chlorine, of which, according to the N.M.R. analysis, 0.61%, by weight is allylic chlorine, taken up in the dicyclopentadiene units of the copolymer.

The chlorinated terpolymer was cured for 2.5, 5, 10, 15 and 20 minutes at 160°C using the curing recipe of comparative example A. The properties of the resulting vulcanizates are set forth in Table 3 below.

Table 3

|  | curing time in minutes | | | | |
| --- | --- | --- | --- | --- | --- |
|  | 2.5 | 5 | 10 | 15 | 20 |
| modulus | — | 232 | 212 | — | — |
| tensile strength | 199 | 232 | 212 | 215 | 228 |
| elongation at rupture | 290 | 300 | 300 | 280 | 290 |
| hardness | 64 | 64 | 65 | 65 | 66 |
| permanent set | 8 | 8 | 8 | — | — |

A mixture of 70 parts by weight of the chlorinated terpolymer and 30 parts by weight of a highly unsaturated styrene/butadiene rubber (SBR 1500, having a styrene content of 23.5 percent by weight and an iodine value of about 150 a molecular weight of about 270.000) were cured at 160°C using the following curing recipe.

| | |
| --- | --- |
| rubber | 100 parts by weight |
| oil (naphthenic) | 30 parts by weight |
| zinc oxide | 3 parts by weight |
| stearic acid | 2 parts by weight |
| high abrasion furnace black | 50 parts by weight |
| phenyl-$\beta$-naphthylamine | 1 part by weight |
| benzthiazyl-2-cyclohexyl-sulphenamide | 1 part by weight |
| sulphur | 1.75 parts by weight |

The vulcanizate obtained after curing for 20 minutes had the properties as set forth in Table 4 below Table 4

| | |
| --- | --- |
| modulus | 192 |
| tensile strength | 192 |
| elongation at rupture | 300 |
| hardness Shore A | 67 |

For comparative purposes a covulcanization run was repeated, but using the unchlorinated, initial terpolymer in place of the chlorinated terpolymer. The properties of the resulting vulcanizate, after 20 minutes of cure, are set forth in Table 5 below.

Table 5

| | |
| --- | --- |
| modulus | 36 |
| tensile strength | 38 |
| elongation at rupture | 330 |
| hardness Shore A | 65 |

Table 5 clearly shows that an unmodified (unhalogenated) terpolymer and a highly unsaturated rubber cannot be covulcanized. On the other hand, covulcanization conducted with the halogenated terpolymer prepared according to the process of the present invention resulted in the production of a vulcanizate with good mechanical properties.

EXAMPLE 2

Comparative example B was repeated, but using the dicyclopentadiene-containing initial terpolymer of Example 1. The chlorination reaction yielded a chlorinated terpolymer having a chlorine content of 3.8% by weight, of which, according to the N.M.R. analysis 0.59% by weight is allylic chlorine, taken up in the dicyclopentadiene units of the copolymer. The chlorinated terpolymer was cured under the same conditions as in comparative example B, with the properties of the resulting vulcanizates set forth in Table 6 below Table 6

|  | curing time in min. | | | | |
| --- | --- | --- | --- | --- | --- |
|  | 2.5 | 5 | 10 | 15 | 20 |
| tensile strength | 210 | 216 | 219 | 225 | 224 |
| elongation at rupture | 280 | 300 | 315 | 305 | 300 |
| hardness Shore A | 67 | 69 | 69 | 68 | 70 |
| permanent set | 8 | 8 | 8 | 8 | 8 |

EXAMPLE 3

100 g of a moist rubber crumb of a terpolymer of 53.9 weight percent ethylene, 42 weight percent propylene, and 4.1 weight percent dicyclopentadiene, containing approximately 50 g of water, was chlorinated for 30 minutes with chlorine gas at 25°C and atmospheric pressure. The chlorination reaction was stopped at the end of the 30 minute chlorination period by replacing the chlorine with pure nitrogen gas. The reaction vessel was purged with pure nitrogen for one hour to expel any remaining traces of chlorine. The resulting terpolymer contained 4.0 weight percent of chlorine. According to the N.M.R. analysis, the chlorinated copolymer thus obtained contains 0.48% by weight of allylic chlorine, taken up in the dicylopentadiene units of the copolymer.

The chlorinated terpolymer was cured at 160°C for 2.5, 5, 10, 15 and 20 minutes using the curing recipe of Comparative Example A. The properties of the resulting vulcanizates are set forth in Table 7 below.

Table 7

|  | curing time in min. | | | | |
| --- | --- | --- | --- | --- | --- |
|  | 2.5 | 5 | 10 | 15 | 20 |
| tensile strength | 104 | 111 | 114 | 128 | 120 |
| elongation at rupture | 190 | 180 | 170 | 180 | 160 |
| hardness | 66 | 66 | 66 | 69 | 70 |

What is claimed is:

1. A process for preparing halogenated rubbery copolymers of about 20 to about 74.7 weight percent ethylene, about 25 to about 79.9 weight percent of at least one other $\alpha$-alkene of up to 8 carbon atoms, from about 0.3 to about 20 weight percent of dicyclopentadiene, alone or with one or more other polyenes of 4 to 12 carbon atoms, said process comprising halogenating the unhalogenated copolymer in the solid state with up to about 20 moles of molecular halogen per gram equivalent of unsaturation in said unhalogenated copolymer at a temperature of between about −30°C and about +80°C.

2. Process according to claim 1 wherein said halogenation temperature is between −30° and +50°C.

3. Process according to claim 1, wherein said halogen is chlorine, bromine or mixtures thereof.

4. Process according to claim 3 wherein at least 0.5 moles of halogen per gram equivalent of unsaturation in the unhalogenated copolymer is used.

5. Process according to claim 4, wherein the amount of halogen is between 1 and 6 moles per gram equivalent of unsaturation.

6. Process according to claim 4, wherein the copolymer is halogenated in the form of a coarse dispersion or suspension in water.

7. Process according to claim 4, wherein said copolymer is halogenated in the form of substantially dry crumb.

8. Process according to claim 4, wherein the halogenation is carried out in the substantial absence of light.

9. Process according to claim 1, wherein the halogenated copolymer product contains from about 0.1 to about 17 weight percent of halogen, based on the total weight of said copolymer.

10. Process according to claim 9, wherein the halogenated copolymer product contains 0.5 to 5 weight percent of halogen.

11. Process according to claim 4, wherein said halogen is chlorine.

12. Process according to claim 4, wherein said unhalogenated copolymer is a crumb having an average particle size of about 3 mm to about 2 cm and a water content of about 0.01 to about 100 weight percent.

13. Chlorinated rubbery copolymers prepared by the process of claim 1.

14. Halogenated rubbery copolymer of about 20 to about 74.7 weight percent ethylene, about 25 to about 79.9 weight percent of at least one other α-alkene of up to 8 carbon atoms. From about 0.3 to about 20 weight percent of dicyclopentadiene and optionally one or more other polyenes of 4 to 10 carbon atoms, containing from about 0.5 to about 5 percent by weight of chlorine, of which at least about 0.35 percent by weight is allylic, taken up in the dicyclopentadiene units of the copolymer.

* * * * *

UNITED STATES PATENT OFFICE
CERTIFICATE OF CORRECTION

Patent No. 3,936,430      Dated February 3, 1976

Inventor(s) Lowhardt A. A. Schoen et al

It is certified that error appears in the above-identified patent and that said Letters Patent are hereby corrected as shown below:

Column 2, line 63, delete "halogenated" and substitute therefor --unhalogenated--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*